(12) United States Patent
Haas et al.

(10) Patent No.: US 9,061,309 B2
(45) Date of Patent: Jun. 23, 2015

(54) PAINTING STATION COMPRISING A MEASURING CELL FOR MEASURING THE LAYER THICKNESS

(75) Inventors: Jürgen Haas, Knittlingen (DE); Frank Herre, Oberriexingen (DE); Hans-Georg Fritz, Ostfildern (DE); Steffen Wesselky, Adelberg (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 872 days.

(21) Appl. No.: 12/937,022

(22) PCT Filed: Mar. 11, 2009

(86) PCT No.: PCT/EP2009/001738
§ 371 (c)(1),
(2), (4) Date: Dec. 29, 2010

(87) PCT Pub. No.: WO2009/124628
PCT Pub. Date: Oct. 15, 2009

(65) Prior Publication Data
US 2011/0094444 A1 Apr. 28, 2011

(30) Foreign Application Priority Data
Apr. 8, 2008 (DE) .................. 10 2008 017 838

(51) Int. Cl.
*B05B 12/08* (2006.01)
*B05B 15/12* (2006.01)
*B05B 12/00* (2006.01)
*G01B 11/06* (2006.01)
*G01B 11/25* (2006.01)
*B05B 13/04* (2006.01)

(52) U.S. Cl.
CPC ........... *B05B 15/1207* (2013.01); *B05B 12/004* (2013.01); *B05B 12/084* (2013.01); *B05B 13/0452* (2013.01); *B05B 15/1292* (2013.01); *G01B 11/0625* (2013.01); *G01B 11/2518* (2013.01)

(58) Field of Classification Search
None
See application file for complete search history.

(56) References Cited

U.S. PATENT DOCUMENTS

| 3,438,803 | A | * | 4/1969 | Alten et al. ............... 427/255.13 |
| 4,334,495 | A | * | 6/1982 | Derkacs et al. ............... 118/669 |
| 4,671,362 | A | * | 6/1987 | Odashima ....................... 169/61 |

(Continued)

FOREIGN PATENT DOCUMENTS

| DE | 19520788 A1 | 7/1996 |
| DE | 19517494 A1 | 11/1996 |

(Continued)

OTHER PUBLICATIONS

English translation for DE 102006009912.*

(Continued)

*Primary Examiner* — Charles Capozzi
(74) *Attorney, Agent, or Firm* — Bejin Bieneman PLC (57) ABSTRACT

A painting station, e.g., for serially painting components such as motor vehicles, is disclosed. A painting station may include at least one painting cell in which components are coated, e.g., with a paint, that has a certain layer thickness. At least one measuring cell is provided for measuring the layer thickness of the paint, e.g., with a radiation source, a radiation detector, and a conveying path along which the components to be coated are conveyed through the painting and measuring cells. The radiation source may emit light in the visible wavelength range.

23 Claims, 5 Drawing Sheets

(56) References Cited

U.S. PATENT DOCUMENTS

| | | | |
|---|---|---|---|
| 5,598,099 A | | 1/1997 | Castleman et al. |
| 5,684,851 A | * | 11/1997 | Kurbatov et al. ............... 378/87 |
| 5,794,704 A | | 8/1998 | Brennecke et al. |
| 6,515,284 B1 | | 2/2003 | Walle et al. |
| 7,220,966 B2 | | 5/2007 | Saito et al. |
| 7,483,510 B2 | * | 1/2009 | Carver et al. ................... 378/57 |
| 7,677,196 B2 | | 3/2010 | Herre |
| 2004/0120456 A1 | * | 6/2004 | Ellenbogen ..................... 378/57 |
| 2005/0022732 A1 | * | 2/2005 | Ito et al. ......................... 118/300 |
| 2005/0061358 A1 | * | 3/2005 | Fenautrigues et al. .......... 134/30 |
| 2006/0140341 A1 | | 6/2006 | Carver |
| 2006/0177566 A1 | * | 8/2006 | Price ................................ 427/8 |
| 2006/0207500 A1 | | 9/2006 | Herre |
| 2007/0227558 A1 | * | 10/2007 | Chase ............................ 134/18 |
| 2008/0061395 A1 | * | 3/2008 | Tkaczyk et al. ............... 257/443 |

FOREIGN PATENT DOCUMENTS

| | | | |
|---|---|---|---|
| DE | 19749984 A1 | 6/1999 | |
| DE | 19756467 A1 | 7/1999 | |
| DE | 19948837 A1 | 4/2001 | |
| DE | 10138167 A1 | 2/2003 | |
| DE | 102006009912 A1 | 9/2007 | |
| DE | 102006022335 A1 * | 11/2007 | ............... B05C 1/00 |
| EP | 1176388 A2 | 1/2002 | |
| EP | 1704924 A1 | 9/2006 | |
| EP | 1749584 A1 | 2/2007 | |
| GB | 2367773 A | 4/2002 | |
| JP | 08050103 A | 2/1996 | |
| JP | 11295040 A | 10/1999 | |
| JP | 2001116520 A | 4/2001 | |
| JP | 2001286798 A | 10/2001 | |
| WO | WO-96/07077 A1 | 3/1996 | |

OTHER PUBLICATIONS

English translation for DE 102006022335 A1.*

Impuls-Thermographie, Fraunhofer Allianz Vision, Version of Jun. 14, 2007.

International Search Report PCT/EP2009/001738 dated Mar. 9, 2009.

* cited by examiner

In one illustration, the component surface to be measured is irradiated in the visible wavelength range, wherefore flashguns or gas discharge lamps can be used for example. The excitation of the component surface to be measured does not necessarily however have to take place by means of light, but rather can take place generally with radiation. Possible radiation sources are ultrasound transmitters, light sources, flashed light sources or light emitting diodes (LEDs), which emit non-dangerous light with regards to energy density and wavelength.

Furthermore, the radiation excitation of the surface to be measured can optionally take place in the form of individual pulses, pulse sequences, in a modulated manner or continuous manner.

On the one hand, the irradiation of the component surfaces to be measured with visible light offers the advantage that there is no health hazard as long as the radiated power is low and the wavelength is configured in such a manner that conventional glass panes lead to absorption, so that the measuring cell can turn out shorter, as no measures are required in order to prevent an escape of the hazardous laser radiation.

On the other hand, the irradiation by means of a flashgun or a gas discharge lamp has the already-mentioned advantage that the irradiation of the component surfaces to be measured takes place in a flat (two dimensional) manner, so that in the context of a single measurement, the layer thickness is not only measured in a punctiform manner, but rather over a certain measurement area. As a result of this, the number of the individual measurements required is reduced, which in turn enables a shortening of the measuring cell and, as a result, facilitates an integration of the measuring cell into an existing painting installation.

The exemplary illustrations are not limited to a certain size of the measurement area, however it is to be mentioned that the measurement area may in some examples be larger than $10\ cm^2$, $50\ cm^2$, $100\ cm^2$, $250\ cm^2$, $500\ cm^2$, $1000\ cm^2$, $1\ m^2$ or $2\ m^2$. The term measurement area used in the context of the exemplary illustrations means that the layer thickness within the measurement area can be determined two dimensionally in a single measurement procedure.

In the case of a measurement by means of an infra-red camera, the layer thickness is measured in each pixel of the infra-red camera. This produces many layer thickness values for each measurement, in accordance with the number of pixels of the infra-red camera. Furthermore, it is also possible to average locally over of a plurality of pixels.

In the case of the exemplary painting installations, the measuring cell may advantageously include a flashgun or a gas discharge lamp as radiation source or excitation source and may include an infra-red camera as radiation detector. The radiation detector may have a wide-angle measuring sensitivity and measure the surface of the painted components in a flat (two dimensional) manner within the respective measurement area.

In an exemplary illustration, the radiation source and/or the radiation detector are arranged in the measuring cell on a portal machine, which spans the transport path, it being possible to arrange the portal machine optionally such that it can move along the transport path or such that it is stationary.

In another exemplary illustration, the radiation source and/or the radiation detector are by contrast arranged in the measuring cell on a stand, the stand optionally being arranged such that it can move along the transport path or such that it is stationary.

Particularly advantageous in the exemplary painting installation is the fact that the measuring cell only requires a relatively small zone length along the transport path, which is generally smaller that the zone length of the painting cell. For example, the zone length of the measuring cell can be smaller than 7 m, 5 m, 3 m, 2 m or 1 m to mention a few limit values, merely as examples.

In an exemplary illustration, a guide for the radiation detector and/or for the radiation source is arranged in the measuring cell, so that the radiation detector and/or the radiation source can take up various relative positions in the vertical and/or lateral direction with respect to the painted components. This movable arrangement of the radiation detector and/or the radiation source makes it possible that only a single radiation detector and/or a single radiation source is arranged in the measuring cell. For measuring the various component surfaces (e.g. roof areas, side areas) of the components to be measured, the radiation detector and/or the radiation source may then be brought into a suitable relative position within the measuring cell relatively to the component to be measured.

In another exemplary illustration, the radiation detector by contrast allows the measurement of a plurality of part areas of the components, which are at an angle with respect to one another, from a predetermined position. For example, the radiation detector in this exemplary embodiment can measure both a side area and the roof and bonnet areas from one position. This enables a complete measurement of the painted components with only two radiation detectors and radiation sources, which are arranged within the measuring cell at suitable positions. Here also, a guide can be provided in order to position the radiation detectors and/or the radiation sources within the measuring cell in the lateral and/or vertical direction.

In a further exemplary illustration, three radiation detectors and/or three radiation sources are by contrast provided in the measuring cell, which may be arranged in a stationary manner in the vertical and lateral direction with respect to the components. Here, two of the radiation detectors and/or two of the radiation sources may be arranged laterally next to the transport path on opposite sides and measure the two side areas of the painted components. One of the radiation detectors and/or one of the radiation sources may, by contrast, be arranged over the transport path and measure the horizontal areas of the painted components, such as for example the roof areas and the bonnet areas of motor vehicle bodies.

In the case of the previously described exemplary illustrations, the portal machine, the stand and/or the guide for the radiation sources or radiation detectors can be moved along the transport path, for example a controllable displacement device can be provided. In the case of a continuous transporting of the painted components by means of the measuring cell, the displacement device may then be, for example, by a system control of the painting installation in such a manner that the radiation sources or radiation detectors move through the measuring cell synchronously to the painted components, in order to prevent a relative movement between the painted components on the one hand and the radiation detectors or radiation sources on the other hand during the measurement procedure.

Alternatively, however, there is also the possibility that the radiation sources or radiation detectors in the measuring cell cannot be moved along the transport path. In the case of a continuous transporting of the painted components through the measuring cell, the relative movement between the painted components on the one hand and the radiation detectors or radiation sources on the other hand may then be subtracted by an image processing computer, in order to enable a meaningful measurement.

Furthermore, there is also the possibility that the radiation detector (e.g. infra-red camera) can measure so quickly that a compensation of the relative movement by means of coupled motion or by means of image processing is unnecessary.

In the case of the irradiation of the painted surfaces by means of a flashgun or a gas discharge lamp, there is the possibility that a fire sensor arranged in the painting installation reacts to the irradiation so that a fire may potentially be erroneously detected. It may therefore be possible to block a fire detection as long as the radiation source is irradiating the painted components for measurement purposes. The painting installation according to the exemplary illustrations can therefore have a fire protection system with at least one fire sensor, at least one extinguishing device and a first control unit, the first control unit being connected at the input side to the fire sensor in order to detect a fire, whilst the first control unit is connected at the output side to the extinguishing device, in order to activate the extinguishing device. The first control unit here detects whether the radiation source irradiates the painted components and blocks the activation of the extinguishing device independently of the signal of the fire sensor as long as the radiation source irradiates the painted components.

Furthermore, the measuring cell in the exemplary painting installation may have an inlet and an outlet, the painted components being transported on the transport path via the inlet into the measuring path and via the outlet out of the measuring cell. It is advantageous here that the inlet and/or the outlet of the measuring cell have a changeable opening cross section, in order to adapt the opening cross section to the actual changeable cross section of the painted components. On the one hand, the cross section adaptation takes place in such a manner that the painted components are not contacted when passing through the inlet or the outlet. On the other hand, the controlling of the opening cross section takes place in such a manner that a minimum clear gap remains between the opening cross section and the outer contour of the respective component. This is advantageous in order to prevent an escaping of the radiation out of the measuring cell, as flashed light for example is disruptive and could activate fire sensors outside of the measuring cell.

The measuring cell therefore may have an infeed device, which sets the opening cross section of the inlet and/or the outlet of the measuring cell in accordance with the actual cross section of the painted components, the infeed device being controlled by a second control unit in accordance with the predetermined cross section of the painted components.

The actual cross section or the actual outer contour of the components running in or out can for example be determined, for example, by one or a plurality of distance sensors or by a so-called light array, this being a plurality of light barriers, which are arranged at right angles to one another. A combination of light barriers and distance sensors is likewise conceivable.

Alternatively, in the context of the exemplary illustrations, there is also the possibility that the actual cross section of the components running in or running out is communicated by a system control.

Further, in the context of the exemplary illustrations, there is also the possibility that the measuring cell has a rolling shutter gate at the inlet and/or outlet side, in order to close the measuring cell during a measurement procedure.

Further, it is advantageous if the radiation source has a screen, which limits the radiation onto the component surface to be measured, it being possible for the screen to have reflective inner areas in order to focus the radiation onto the measurement area.

In the exemplary painting installations, a plurality of painting cells can be arranged along the transport path one downstream of the other, which painting cells apply several paint layers lying one above the other onto the individual components one after another. Here, one measuring cell for layer thickness measurement can in each case be arranged downstream of each of the painting cells, so that the layer thicknesses of the individual paint layers can be determined. The individual layer thicknesses cannot generally be determined independently of one another however, which also applies if measuring is carried out after each individual paint application. The measuring system therefore generally always measures the overall layer of the paint layers applied. From the overall thicknesses measured, the layer thickness of the individual paint layers can then be calculated.

Alternatively, there is also the possibility of using a measuring cell with a layer thickness measuring device, which can selectively measure the individual layers of a multi-layer coating structure. In this case, it is sufficient if a single measuring cell is arranged at the end of the painting process, that is to say in the conveying direction downstream of all of the painting cells. This does not prevent the use of a plurality of measuring stations as well, however, in order to be able to react more quickly to defects in the painting process.

Furthermore, it is possible in the context of the exemplary illustrations that the layer thickness determined is used as a controlled variable in a control loop, in order to correspondingly re-adjust the application control and thus to ensure a layer thickness, which is as constant as possible.

Other advantageous aspects of the exemplary illustrations are explained in more detail together with the description of the various exemplary illustrations on the basis of the drawings.

Figure 1:
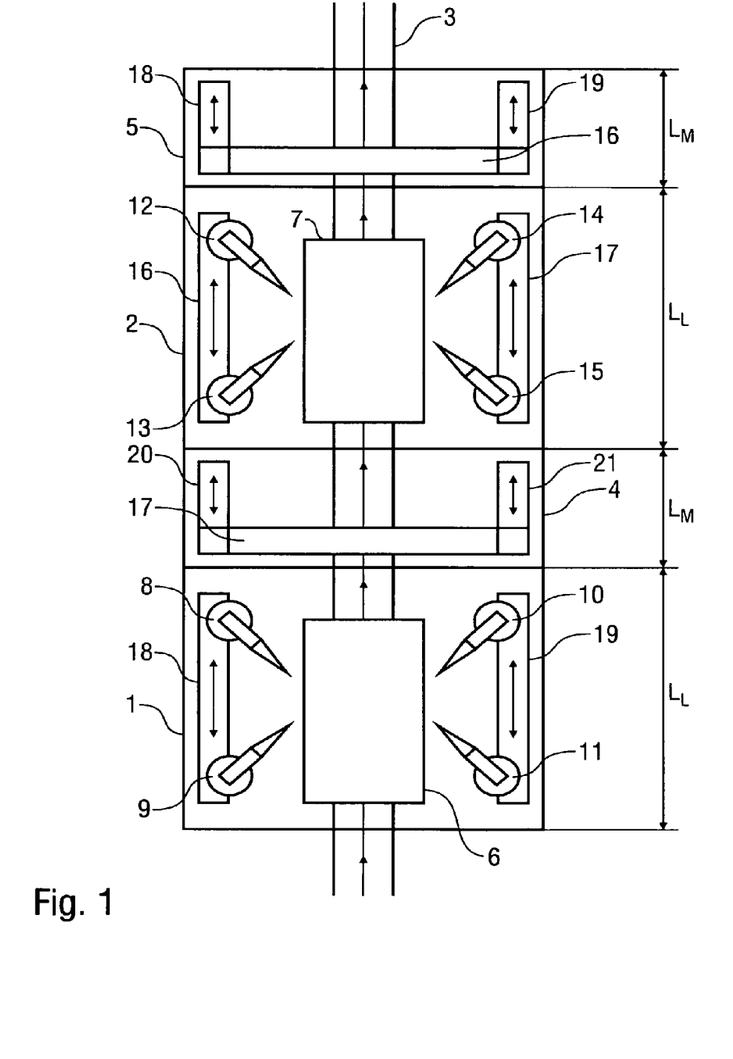

FIG. 1 shows a schematic, strongly simplified illustration of an exemplary painting installation with two painting cells 1, 2, arranged along a transport path 3, with one downstream of the other, one measuring cell 4, 5 for layer thickness measurement in each case being arranged downstream of each of the two painting cells 1, 2. The measuring cell 4 therefore measures the layer thickness of the paint layer applied by the painting cell 1, whereas the measuring cell 5 measures the layer thickness of the paint layer applied by the painting cell 2.

Motor vehicle bodies 6, 7 may be transported through the painting installation on the transport path 3, it being possible for the transporting to take place continuously or in a "stop-and-go" operation. In the case of a "stop-and-go" operation, the individual painting cells 1, 2 may accommodate the complete motor vehicle bodies 6, 7 in each case.

A plurality of multi-axial painting robots 8-11 or 12-15 may be arranged in the two painting cells 1, 2. The painting robots 8-11 or 12-15 may be movable along the transport path 3 on travel rails 16-19, and may include any type of painting robot that is convenient.

A portal machine 16, 17 may be located in the measuring cells 4, 5 in each case, which spans the transport path 3 and can be moved on transport rails 18, 19 or 20, 21 along the transport path 3.

Figure 2:
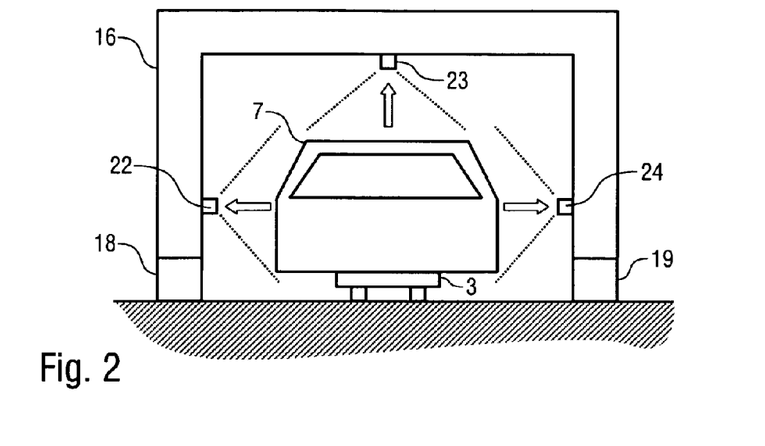

From the cross-sectional view in FIG. 2, it can be seen that the portal machine 16 in all carries three layer thickness measuring devices 22-24, in order to measure the layer thickness of the paint applied onto the motor vehicle body 7.

The layer thickness measuring devices 22 and 24 are here attached to upwardly projecting posts of the portal machine 16 on the inside and measure the layer thickness on the side areas of the motor vehicle body 7.

The layer thickness measuring device 23 is, by contrast, attached over the transport path 3 above the motor vehicle body 7 to be measured and measures the roof areas and bonnet areas of the motor vehicle body 7 from above.

The individual layer thickness measuring devices 22-24 may contain, for example, a radiation source such as a flashgun in each case, and radiation detector, such as an infra-red camera, in each case, which may measure the body 7 in a wide-angled manner and over a large area and deliver a two-dimensional layer thickness image.

Figure 3:
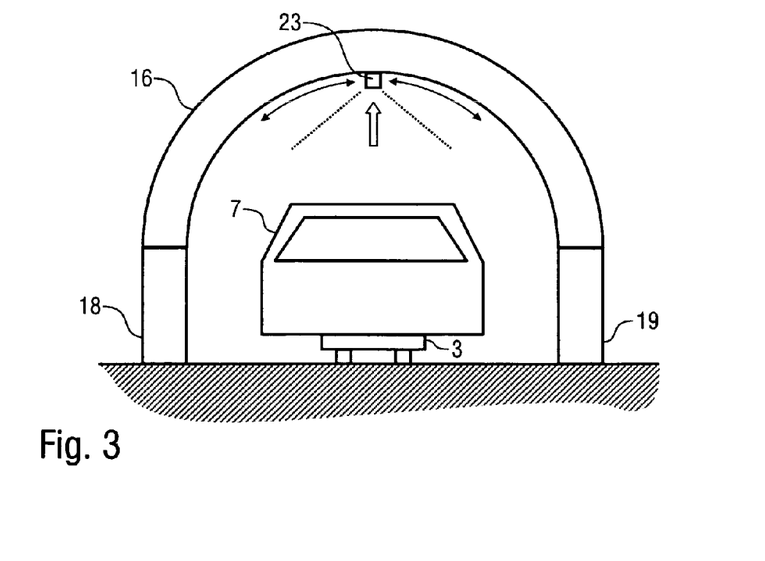

FIG. 3 shows a cross-sectional view of an alternative exemplary embodiment of the portal machine 16, this exemplary embodiment to some extent tallying with the previously described exemplary embodiment, so that to avoid repetitions, reference is made to the previous description and the same reference numbers are used.

A peculiarity of this exemplary embodiment consists in the fact that the layer thickness measuring device 23 is the only layer thickness measuring device, it being possible to guide the layer thickness measuring device 23 in an arcuate manner along the portal machine 16 around the motor vehicle body 7 to be measured, in order to measure the motor vehicle body 7 from various perspectives. In the position shown in FIG. 3, the layer thickness measuring device 23 for example measures the roof areas and the bonnet areas of the motor vehicle body 7.

For measuring the side areas of the motor vehicle body 7, the layer thickness measuring device 23 is by contrast guided along the arcuate portal machine 16 to the side of the motor vehicle body 7.

Figure 4:
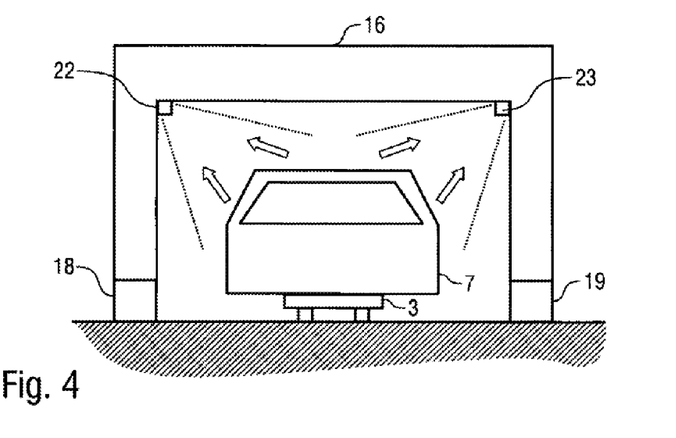

FIG. 4 shows a further exemplary embodiment of the portal machine 16, which to some extent tallies with the previously described exemplary embodiments, so that to avoid repetitions, reference is made to the previous description, the same reference numbers being used in the following for corresponding details.

A peculiarity of this exemplary embodiment consists in the fact that the two layer thickness measuring devices 22, 23 are in each case arranged at the two opposite upper corners of the portal machine 16, so that the two layer thickness measuring devices 22 can in each case measure the roof and bonnet areas and the respectively facing side area of the motor vehicle body 7.

Common to the exemplary illustrations provided herein is the fact that the portal machine 16 may be moved on the guide rails 18, 19 along the transport path 3 during a measurement in synchronized movement with the motor vehicle body 7 to be measured, so that the layer thickness measuring devices 22-24 on the one hand and the motor vehicle body 7 to be measured on the other hand may maintain a constant relative position to one another along the transport path 3. This may advantageously increase the accuracy of a measurement of a coating layer thickness.

Figure 5A:
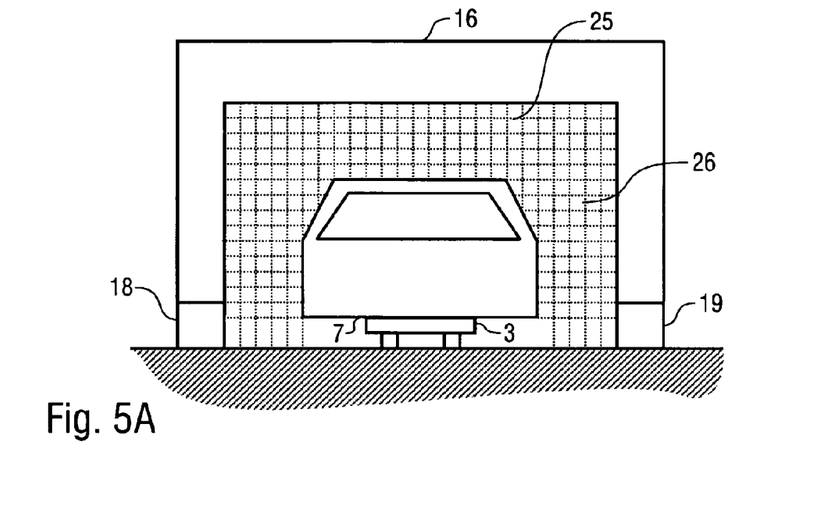
Figure 5B:
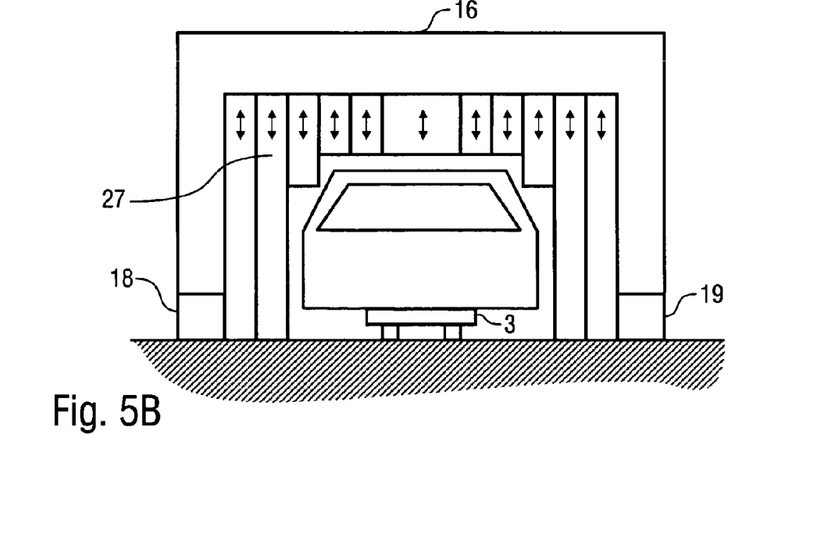

The FIGS. 5A and 5B show the inlet of the measuring cell 5. It can be seen therefrom that a so-called light array is arranged in the inlet of the measuring cell 5, which consists of horizontally running light barriers 25 and vertically running light barriers 26 and determines a cross section or a contour of the motor vehicle body 7 to be measured.

The opening cross section of the inlet of the measuring cell 5 may then be set as a function of the determined contour of the motor vehicle body 7 running in such a manner that, on the one hand, a contacting of the painted motor vehicle body 7 is avoided, but, on the other hand, the remaining clear gap between the opening cross section of the inlet and the outer contour of the motor vehicle body 7 running in is as small as possible. This makes sense, so that substantially no disruptive flashed light escapes from the measuring cell 5.

The inlet of the measuring cell 5 therefore may include a plurality of curtain elements 27, which can be lowered in the arrow direction independently of one another, in order to achieve the desired cross-sectional adaptation of the inlet.

Figure 6:
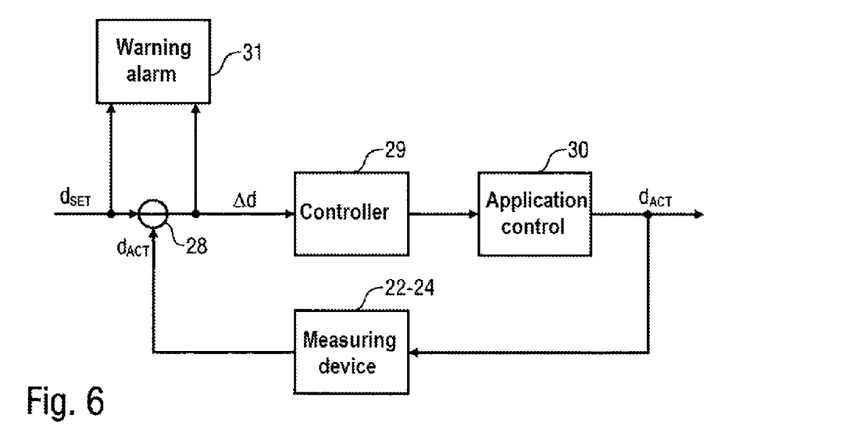

FIG. 6 shows an exemplary control loop with one of the layer thickness measuring devices 22-24, which measures an actual value $d_{ACT}$ of the paint layer on the motor vehicle body 6 or 7.

The actual value $d_{ACT}$ may be supplied to a subtractor 28, which determines an actual/target-deviation $\Delta d$ by comparing the actual value $d_{ACT}$ with a predetermined set value $d_{SET}$ of the layer thickness.

The deviation $\Delta d$ is then supplied to a controller 29, which controls an application control 30 as a function of the variance, in order to achieve maintenance of the predetermined set value $d_{SET}$ of the layer thickness, which is as constant as possible.

Furthermore, the set value $d_{ACT}$ and the deviation $\Delta d$ may be supplied to a warning alarm 31, which emits a warning signal if the deviation $\Delta d$ becomes too large. Here, the predetermined set value $d_{SET}$ is also taken into account, as the warning alarm 31 emits a warning signal if the deviation $\Delta d$ exceeds a predetermined percentage value of the set value $d_{SET}$.

Figure 7:
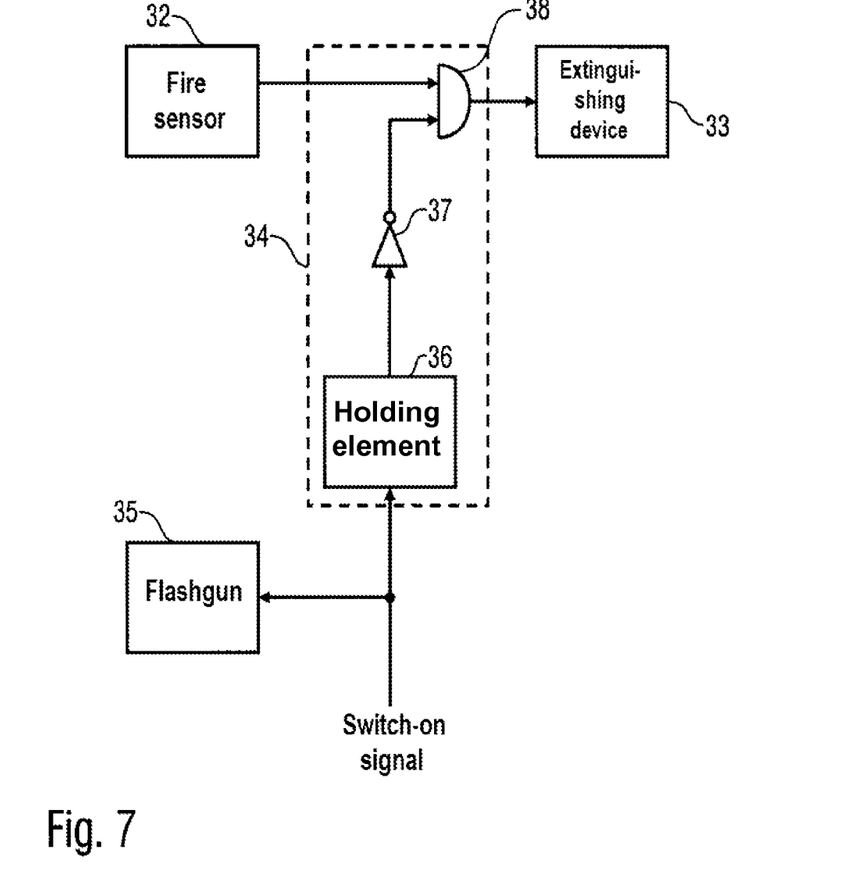

Finally, FIG. 7 shows a fire extinguishing device schematically and in a strongly simplified manner, which can be integrated into the measuring cells 4, 5.

The fire extinguishing device consists of at least one fire sensor 32, at least one extinguishing device 33 and a control unit 34. The control unit may control the extinguishing device 33 as a function of the output signal of the fire sensor.

Here, a flashgun 35 may be switched on by a switch-on signal during the layer thickness measurement. Problematic here is the fact that the radiation emitted by the flashgun 35 can lead to a false triggering of the fire sensor 32, which may be undesirable. The switch-on signal for the flashgun 35 is therefore also supplied to the control unit 34, which, during the switch-on time of the flashgun 35, blocks an activation of the extinguishing device 33.

For this purpose, the control unit 34 has a hold element 36 at the input side, the hold element 36 holding the switch-on signal for the flashgun 35 at the output side until the radiated power output has faded away to such an extent that a false triggering of the fire sensor 32 is reliably excluded. The output signal of the holding element 36 may then be passed via an inverter 37 to an AND element 38, which is also controlled at the input side by the fire sensor 32. The control unit 34 only activates the extinguishing device 33 if the fire sensor 32 detects a fire and if, at the same time, the inverter 37 delivers a low level to the AND element 38, which is only the case if there is no danger of false triggering by means of the flashgun 35.

The exemplary illustrations are not limited to the specific examples illustrated above. Rather, a plurality of variations and alterations are possible that also make use of the ideas described herein, and therefore fall within the scope of protection. Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

REFERENCE LIST 1, 2 Painting cell
3 Transport path
4, 5 Measuring cell
6, 7 Motor vehicle body
8-15 Painting robots
16, 17 Portal machines
18-21 Transport rails
22-24 Layer thickness measuring devices
25, 26 Light barriers
39 Curtain elements
40 Subtractor
41 Controller
42 Application control
43 Warning alarm
44 Fire sensor
45 Extinguishing device
46 Control unit
47 Flashgun
48 Holding element
49 Inverter
50 AND element

The invention claimed is:

1. Painting installation for a serial painting of components, wherein the painting installation comprises:
   at least one painting cell, in which the components are coated with a paint with a certain layer thickness,
   at least one measuring cell for measuring the certain layer thickness of the paint on the components, said at least one measuring cell comprising at least one radiation source configured to irradiate the coated components and at least one radiation detector configured to detect a radiation reflected by the irradiated components, in order to determine the layer thickness therefrom, and
   a transport path, along which the components to be painted are transported through the at least one painting cell and subsequently through the at least one measuring cell, wherein
   the at least one radiation source irradiates the surfaces of the painted components to be measured in a two-dimensional manner, and
   the at least one radiation detector measures the surfaces of the painted components to be measured in a two-dimensional manner; and
   the at least one radiation source and the at least one radiation detector in the at least one measuring cell are arranged on a portal machine that spans the transport path and is configured to move along the transport path in synchronized movement with one of the painted components while the one painted component is being measured.

2. Painting installation according to claim 1, wherein the at least one radiation source of the at least one measuring cell includes one of a flashgun and a gas discharge lamp.

3. Painting installation according to claim 1, wherein the at least one radiation detector is an infra-red camera.

4. Painting installation according to claim 1, wherein the at least one radiation source of the at least one measuring cell radiates light in the visible wavelength range.

5. Painting installation according to claim 1, wherein the radiation at least one detector measures the layer thickness on the painted components in a single measurement procedure over a certain measurement area, wherein the measurement area is larger than 50 cm$^2$.

6. Painting installation according to claim 1, wherein the at least one radiation detector scans the layer thickness on the painted components point by point, in columns, or in rows.

7. Painting installation according to claim 1, wherein the at least one measuring cell and the at least one painting cell each have a respective certain zone length along the transport path, wherein the zone length of the at least one cell is smaller than the zone length of the at least one painting cell, and smaller than 7 meters.

8. Painting installation according to claim 1, wherein a guide for the at least one radiation detector is arranged in the at least one measuring cell, the at least one radiation detector configured be positioned about a plurality of relative positions with respect to the painted components.

9. Painting installation according to claim 1, wherein only a single radiation detector is provided in the at least one measuring cell.

10. Painting installation according to claim 1, wherein:
    the components to be painted have a plurality of part areas, which are at an angle with respect to one another, the plurality of part areas including side areas, roof areas, bonnet areas, front areas and rear areas,
    the at least one radiation detector can measure the plurality of part areas from one position, and
    a guide for the at least one radiation detector is arranged in the at least one measuring cell, the at least one radiation detector configured to be positioned at a plurality of relative positions in at least one of a lateral direction and a vertical direction with respect to the transport path.

11. Painting installation according to claim 1, wherein:
    at least three radiation detectors are provided in the at least one measuring cell,
    the radiation detectors in the at least one measuring cell are arranged in a stationary manner in the vertical and lateral direction, with respect to the transport path two of the radiation detectors are arranged laterally next to the transport path on different sides and measure the radiation, which is reflected by side areas of the painted components, and one of the radiation detectors is arranged over the transport path and measures the radiation, which is reflected by horizontal areas, including roof areas and bonnet areas of the painted components.

12. Painting installation according to claim 1, wherein
the portal machine is movable along the transport path with a controllable displacement device, the displacement device is controlled by a system control configured to control the at least one radiation source and the at least one radiation detector to move along the transport path substantially in synchronization with the painted components and in a substantially constant relative position with respect to the painted components.

13. Painting installation according to claim 1, further comprising a fire protection system comprising at least one fire sensor, at least one extinguishing device and a first control unit, wherein the first control unit is connected at an input side to the at least one fire sensor, the at least one fire sensor configured to detect a fire, the first control unit connected at an output side to the at least one extinguishing device and configured to activate the at least one extinguishing device when a fire is detected.

14. Painting installation according to claim 13, wherein:
the first control unit is configured to detect whether the at least one radiation source is irradiating the painted components, and the first control unit is configured to block the activation of the at least one extinguishing device as long as the at least one radiation source is irradiating the painted components.

15. Painting installation according to claim 1, wherein:
the at least one measuring cell has an inlet, via which the painted components are transported into the at least one measuring cell on the transport path, the at least one measuring cell has an outlet, via which the painted components are transported out of the at least one measuring cell on the transport path, and the inlet and the outlet of the at least measuring cell has an adjustable opening cross section, in order to adapt the opening cross section to a cross section of the painted components.

16. Painting installation according to claim 15, further comprising:

an infeed device, which sets the opening cross section of at least one of the inlet and the outlet of the at least one measuring cell according to the cross section of the painted components, and a second control unit configured to control the infeed device according to the predetermined cross section of the painted components.

17. Painting installation according to claim 16, further comprising one of a distance sensor connected to the second control unit, and a light array configured to determine the cross section of the painted components.

18. Painting installation according to claim 16, wherein the second control unit is connected to a system control and obtains saved cross sections of the painted components from the system control.

19. Painting installation according to claim 15, wherein at least one of the inlet and the outlet of the at least one measuring cell can be closed with a rolling shutter gate.

20. Painting installation according to claim 1, wherein:
the at least one radiation source includes a screen configured to limit radiation to the one painted component surface to be measured, wherein the screen has reflective inner areas.

21. Painting installation according to claim 1, wherein:
a plurality of painting cells are arranged one downstream of the other along the transport path, and one measuring cell for layer thickness measurement is arranged downstream of each of the painting cells.

22. Painting installation according to claim 1, further comprising a control loop, the control loop configured to:
measure the layer thickness of the paint applied in the at least one measuring cell on the painted components as a controlled variable, compare the measured layer thickness with a predetermined set value of the layer thickness and determine a deviation between the predetermined set value and the measured layer thickness, and control an application device in the at least one painting cell via a controller according to the deviation between the predetermined set value and the measured layer thickness.

23. Painting installation according to claim 1, wherein synchronized movement of the portal with the one painted component while the one painted component is being measured includes movement of the portal such that the at least one measuring cell and the one painted component maintain a substantially constant relative position to one another along the transport path.

* * * * *

UNITED STATES PATENT AND TRADEMARK OFFICE
CERTIFICATE OF CORRECTION

PATENT NO. : 9,061,309 B2
APPLICATION NO. : 12/937022
DATED : June 23, 2015
INVENTOR(S) : Haas et al.

Page 1 of 1

It is certified that error appears in the above-identified patent and that said Letters Patent is hereby corrected as shown below:

In the claims:

Column 10, in line 28, replace "radiation at least one detector" with -- at least one radiation detector --;

Column 10, in lines 38-39, replace "path , wherein the zone length of the at least one cell is smaller" with -- path, wherein the zone length of the at least one measuring cell is smaller --;

Column 12, in line 20, replace "to limit radiation" with -- to limit the radiation --.

Signed and Sealed this
Tenth Day of November, 2015

Michelle K. Lee
*Director of the United States Patent and Trademark Office*